United States Patent
Bolash et al.

[19]

[11] Patent Number: 5,936,371
[45] Date of Patent: Aug. 10, 1999

[54] METHOD AND APPARATUS FOR CONTROLLING A SERVO MOTOR USING A STEPPER MOTOR CONTROLLER INTEGRATED CIRCUIT

[75] Inventors: John Phillip Bolash; Mark Joseph Edwards, both of Lexington, Ky.

[73] Assignee: Lexmark International, Inc., Lexington, Ky.

[21] Appl. No.: 09/250,522

[22] Filed: Feb. 16, 1999

[51] Int. Cl.[6] ........................................................ H02P 8/00
[52] U.S. Cl. ............................. 318/685; 318/696; 318/687
[58] Field of Search .................................... 318/138, 139, 318/245–293, 585, 687, 696, 701

[56] References Cited

U.S. PATENT DOCUMENTS

| | | |
|---|---|---|
| 4,084,122 | 4/1978 | Gettings . |
| 4,176,272 | 11/1979 | Powers . |
| 4,203,678 | 5/1980 | Nordstrom et al. . |
| 4,340,848 | 7/1982 | Hanagatta et al. . |
| 4,412,166 | 10/1983 | Crider et al. . |
| 4,613,806 | 9/1986 | Majewski . |
| 4,721,896 | 1/1988 | Klinger . |
| 4,739,346 | 4/1988 | Buckley . |
| 4,829,222 | 5/1989 | Hallenbeck et al. . |
| 4,859,923 | 8/1989 | Malka et al. . |
| 5,038,088 | 8/1991 | Arends et al. . |
| 5,087,867 | 2/1992 | Kruppa . |
| 5,177,422 | 1/1993 | Kataoka et al. . |
| 5,185,627 | 2/1993 | Hartman . |
| 5,264,770 | 11/1993 | Coutu . |
| 5,329,214 | 7/1994 | Williamson et al. . |
| 5,347,300 | 9/1994 | Futagawa . |
| 5,708,578 | 1/1998 | Stoddard et al. ........................ 363/98 |
| 5,710,499 | 1/1998 | Carvajal . |
| 5,757,398 | 5/1998 | Anderson . |
| 5,859,518 | 1/1999 | Vitunic ..................................... 318/701 |

*Primary Examiner*—Paul Ip
*Attorney, Agent, or Firm*—Frederick H. Gribbell; D. Brent Lambert

[57] ABSTRACT

An improved DC servo motor driver circuit is provided that is based upon a readily available conventional stepper motor driver integrated circuit (IC). The IC's current "Sense" line that is usually connected to a low value resistor is instead tied to DC common or to ground. The IC's "Comparator" input, which is usually connected to the current Sense line, is connected to a pulsing input signal that provides the comparators with an appropriate voltage to make the comparators believe that more current is required at the very times the remaining portions of the circuit are attempting to provide current to the DC servo motor. An RC circuit is provided at the IC's "Pulse Time" input so that the monostable timer is properly triggered. An ASIC provides the proper logic signals to not only control the direction of the DC servo motor, but also to provide pulses of an appropriate frequency and duty cycle to emulate a pulse-width modulator. The direction signal is connected to the "Phase" input, and the pulse-width modulated signal is provided to interface circuitry that drives the Comparator and Pulse Time inputs. The output transistors in an H-bridge driver stage within the stepper motor driver IC are controlled so as to provide pulse-width modulated voltage pulses across the motor winding of the DC servo motor, such that this DC servo motor can operate exactly as if it were being driven by an integrated circuit that was specifically designed to act as a DC servo motor driver circuit. The average current supplied over time to the DC servo motor is directly related to the duty cycle of the pulse-width modulated voltage pulses across its winding, which in turn is directly related to the duty cycle of the main input control signal.

25 Claims, 6 Drawing Sheets

FIG. 7

METHOD AND APPARATUS FOR CONTROLLING A SERVO MOTOR USING A STEPPER MOTOR CONTROLLER INTEGRATED CIRCUIT

TECHNICAL FIELD

The present invention relates generally to electric motor driver equipment and is particularly directed to an electrical circuit of the type which drives a DC servo motor. The invention is specifically disclosed as an interface circuit mated with a conventional stepper motor driver integrated circuit which allows this stepper motor driver IC to satisfactorily drive a DC servo motor at a significant cost reduction as compared to conventional DC servo motor driver IC's.

BACKGROUND OF THE INVENTION

Many ink jet printers use DC servo motors to drive the movable carriage that contains the ink jet printhead. DC servo motors have been used for many years for driving variable-speed devices, or for driving low power constant-speed devices that run from direct current, rather than from alternating current. However, stepper motors have become much more prevalent in many low-power applications for not only variable positioning devices, but also for variable-speed or constant-speed devices. Consequently, the integrated circuits that control stepper motors have become much less expensive, due to their much greater quantity of production, than integrated circuits that control DC servo motors.

While stepper motor driver circuits are less expensive than DC servo motor driver circuits, these devices are certainly not interchangeable with one another, and also their actual motor constructions are not interchangeable with one another. Stepper motors require control of two separate windings, and the current through each of these windings must be controllable in both directions by the driver circuitry. Moreover, stepper motors have been very useful for exact positioning applications, and have not completely replaced DC servo motors for certain applications, such as constant-speed drives using a low power DC power supply.

Figure 1:
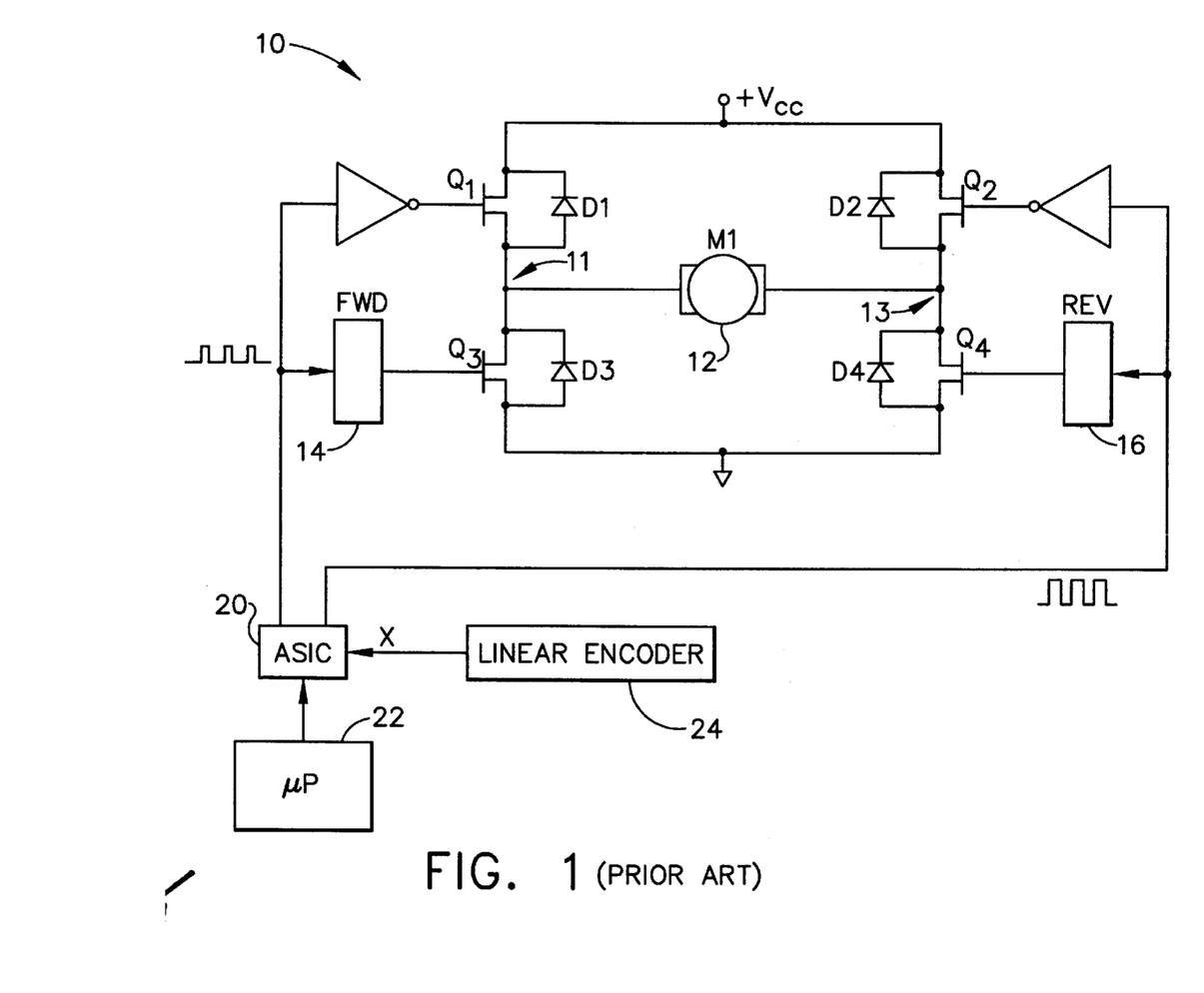
FIG. 1 is a block diagram in partial schematic of a prior art DC servo motor driver circuit, as used with conventional printers.

DC servo motors are typically driven with an electronic circuit that includes an "H-bridge" output driver stage, which is illustrated in FIG. 1 in some detail, and will be described in greater detail hereinbelow in the "Detailed Description." The branches of the circuit that make up the "H-bridge" comprise the four output transistors and the DC servo motor, which comprises the cross-bar of the "H." The method in which the four transistors are controlled determines whether or not the DC servo motor turns in its forward direction or in its reverse direction.

It would be commercially advantageous to be able to drive a DC servo motor while using a lower cost integrated circuit than the commonly-used L6202 integrated circuit, which is manufactured by SGS-Thomson Microelectronics.

SUMMARY OF THE INVENTION

Accordingly, it is a primary advantage of the present invention to provide a low-cost DC servo motor driver circuit that uses a readily available stepper motor driver integrated circuit chip.

It is another advantage of the present invention to provide a DC servo motor driver circuit that is substantially less expensive than those commonly available as standard conventional driver circuits.

It is a further advantage of the present invention to provide an interface circuit that operates with a stepper motor integrated circuit that is capable of driving a DC servo motor.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved DC servo motor driver circuit is provided that is based upon a conventional integrated circuit that is readily available, but which is designed specifically for use with stepper motors. The current "Sense" line that is usually connected to a low value resistor is instead tied to DC common, or to ground. In addition, the "Comparator" input, which is usually connected to the current Sense line, is connected to a pulsing input signal that provides the comparators with an appropriate voltage to make the comparators believe that more current is required at the very times the remaining portions of the circuit are attempting to provide current to the DC servo motor. An RC circuit is provided at the "Pulse Time" input so that the monostable timer is properly triggered, which will in turn send an appropriate signal to the logic drivers that turn on the power transistors at the appropriate moments.

This DC servo motor driver, in an exemplary circuit, is used in a printer that uses a microprocessor to control an Application Specific Integrated Circuit (ASIC) which provides the proper logic signals to not only control the direction of the DC servo motor, but also to provide pulses of an appropriate frequency and duty cycle to emulate a pulse-width modulator, which acts as the main input control signal. The direction signal is connected to the "Phase" input, and the pulse-width modulated signal is provided to interface circuitry that drives the Comparator and Pulse Time inputs.

By appropriate use of signals generated by the ASIC, the output transistors in the H-bridge driver stage within the stepper motor driver integrated circuit are controlled so as to provide pulse-width modulated voltage pulses across the motor winding of the DC servo motor, such that this DC servo motor can operate exactly as if it were being driven by a dedicated DC servo motor driver circuit. The average current supplied over time to the DC servo motor is directly related to the duty cycle of the pulse-width modulated voltage pulses across its winding, which in turn is directly related to the duty cycle of the main input control signal. The ASIC is also interfaced to a optical encoder strip which provides closed-loop feedback control of the actual position of the printer's carriage.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Referring now to the drawings, FIG. 1 is a block diagram in partial schematic showing a prior art DC servo motor driver circuit 10, which includes an "H-bridge" output stage. This H-bridge comprises four field-effect transistors designated Q1, Q2, Q3, and Q4, as well as the field winding of the DC servo motor M1, designated by the reference numeral 12. Depending upon the combination of these field effect transistors (FET's), the servo motor 12 will either be at rest, or will turn in its forward or reverse direction.

The energization of DC servo motor 12 is controlled by pulses that actuate one pair or the other of the four transistors Q1–Q4. In the forward direction, a logic element and high voltage interface driver 14 is used to appropriately turn on transistors Q2 and Q3. In the reverse direction, a similar logic element and high-voltage interface driver 16 is used to turn on transistors Q1 and Q4. These forward and reverse drivers 14 and 16, respectively, are in turn controlled by an Application Specific Integrated Circuit (ASIC) 20, which in turn is controlled by a microprocessor 22.

This conventional DC servo motor driver 10 has been used in many ink jet printer circuits, and in such applications, a linear encoder 24 is used to provide a position feedback signal to ASIC 20. As is well known in the art, an exemplary linear encoder strip is placed along the path of the printer's ink jet cartridge carriage, and the encoder strip 24 preferably comprises a plastic strip with linearly spaced-apart dark lines that are optically read by a sensor that is mounted to the carriage. Such strips are typically used in classic DC servo motor drives, and it is preferred that there are two channels of pulses generated by the optical sensor, in which these pulses are in quadrature relationship to one another.

Each of the FET's Q1–Q4 includes a protective diode D1–D4, and the output terminals of an exemplary integrated circuit are depicted by the nodes 11 and 13 on FIG. 1. Such an exemplary integrated circuit for driving DC servo motors is a part number L6202, manufactured by SGS-Thomson Microelectronics. In the L6202 chip, the H-bridge transistors and diodes Q1–Q4 and D1–D4 are included, as well as the forward and reverse logic drivers 14 and 16.

The ASIC 20 and microprocessor 22 are typically provided as part of the printer control mechanism, and the linear encoder 24 provides a signal referred to as "X" to ASIC 20. In one exemplary ink jet printer manufactured by Lexmark International, Inc., the drive voltage Vcc is set at +30 volts DC, and the logic voltage used by the ASIC and microprocessor are at +5 volts DC.

Figure 2:
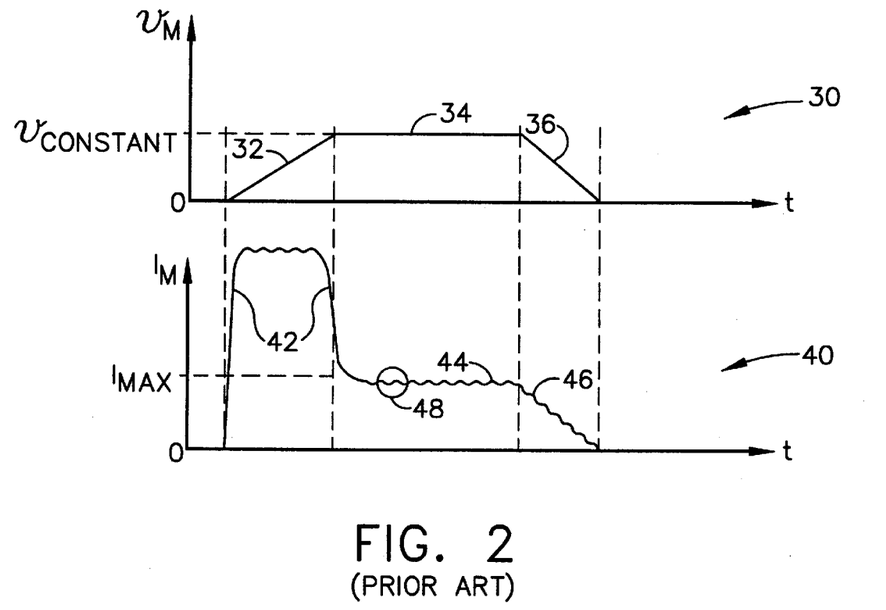
FIG. 2 is a graph of some of the important physical parameters versus time of the prior art DC servo motor driver of FIG. 1.

FIG. 2 is a graph 30 showing the rotational velocity of the motor 12 versus time, and the instantaneous current through the motor winding versus time at the reference numeral 40. On the velocity graph 30, it can be seen that the initial velocity is zero, and that the velocity ramps up very quickly at a line 32. Once the velocity has reached its desired "constant" velocity, the DC servo motor driver 10 maintains that velocity, as can be seen at a line 34. After the ink jet carriage has traveled completely through its normal displacement, the velocity then decreases rather rapidly, as seen at a line 36.

On the current graph 40, the "time" axis directly corresponds along the horizontal to the time axis of the velocity graph 30. The motor current rises to an acceleration level due to inertial load, as indicated by a curve 42, until the motor reaches its desired constant velocity. The motor current settles down to a relatively straight line with a small amount of ripple, as seen at 44. A detail of this constant velocity stage of the motor current is depicted on FIG. 3, which corresponds to the small area of the chart 40 designated by the circle 48. Once the ink jet carriage has traveled through its complete displacement, the motor current quickly ramps down, as seen at a jagged line 46, after which the current stays at zero until the next movement of the carriage is desired.

The reason that the motor current appears to have a jagged or rippling effect is that the motor 12 is not provided with a pure DC signal, but instead is provided with pulses of current at a fairly high frequency of 20 kHz. The enlarged portion of the current curve from the circle 48 is illustrated in FIG. 3, which shows these 20 kHz pulses in greater detail.

Figure 3:
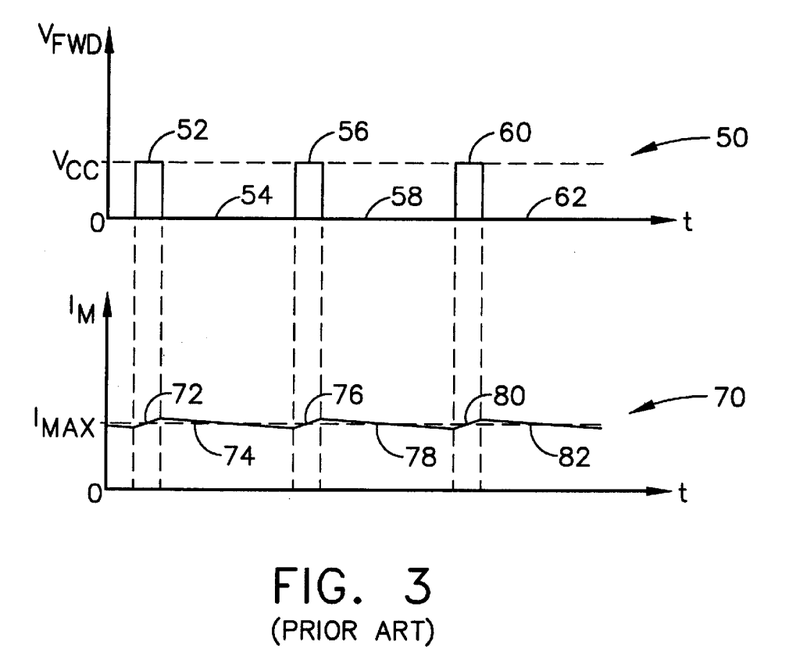
FIG. 3 is another graph of other physical parameters versus time of the DC servo motor driver of FIG. 1.

FIG. 3 illustrates two graphs, one of the motor voltage in its forward direction versus time at the reference numeral 50, and the other of the motor current versus time at the reference numeral 70. In the graph 50, the motor pulses are seen at the reference numerals 52, 56, and 60. These are also called the "ON-time" pulses for the forward motor voltage. The corresponding "OFF-time" are designated by the reference numerals 54, 58, and 62. These pulses are directly across the motor's windings, i.e., across the outputs of the H-bridge circuit at nodes 11 and 13. On FIG. 3, the duty cycle is illustrated as being approximately 20%, which means that the ON-time pulses have a duration of approximately 10 $\mu$sec, and the OFF-time duration will be approximately 40 $\mu$sec, leading to a total duty cycle period of 50 $\mu$sec, for a corresponding frequency of 20 kHz.

The motor current values depicted on the graph 70 show that the current has already ramped up to its "maximum" value, which is not a true maximum possible current available from the DC power supply, but instead represents the maximum current required by the motor 12 to move the carriage at its desired constant velocity (as seen at 34 on FIG. 2). The horizontal time axis on the graph 70 directly corresponds to the horizontal time axis on the graph 50, and it thus can be seen that the ON-time current ramps at a linear rate, as seen at the reference numerals 72, 76, and 80. The corresponding OFF-time current decays at an exponential rate (which cannot really be seen at this scale), as depicted by the reference numerals 74, 78, and 82.

ASIC 20 generates the appropriate frequency pulses and provides the pulses directly to either the "Forward" driver 14 or the "Reverse" driver 16, as appropriate. These pulse-width modulated signals are then provided to the appropriate transistors Q1–Q4. In the forward direction, Q2 is turned on continuously, while Q3 is only turned on during the ON-time periods of the signal being transmitted by ASIC 20. Motor current is provided from the power supply when transistors Q2 and Q3 are both simultaneously turned ON by a positive pulse supplied by ASIC 20 to the input of Forward driver 14, and a low logic level supplied by ASIC 20 at the input of Reverse driver 16. It is preferred that the input to the Reverse driver 16 be kept at a low logic level while in the forward direction, thereby keeping Q2 continuously turned ON through its inverting buffer and keeping Q4 continuously turned OFF. Motor current "free wheels" through transistors Q1 and Q2 when the pulse at the input of Forward driver 14 is brought to a low logic state (i.e., between positive-going pulses).

To rotate the motor 12 in the reverse direction, the Reverse driver 16 provides positive pulses to the transistor Q4 having virtually the same duty cycle as positive pulses that are transmitted by ASIC 20 to the Reverse driver 16, which turns ON Q4 during those pulses. At the same time, transistor Q1 is continuously turned on through its inverting buffer when a low logic level is supplied by ASIC 20 at the input of Forward driver 14, for the same reasons as related above with respect to transistor Q2.

As in all typical DC servo motor drives, to achieve the constant velocity desired by the carriage of the ink jet printer, the duty cycle is varied depending upon the physical load of the carriage and its corresponding mechanical components, and also depending upon the voltage level of Vcc, which itself has an appreciable ripple, since in many systems that voltage supply is not regulated.

Figure 4:
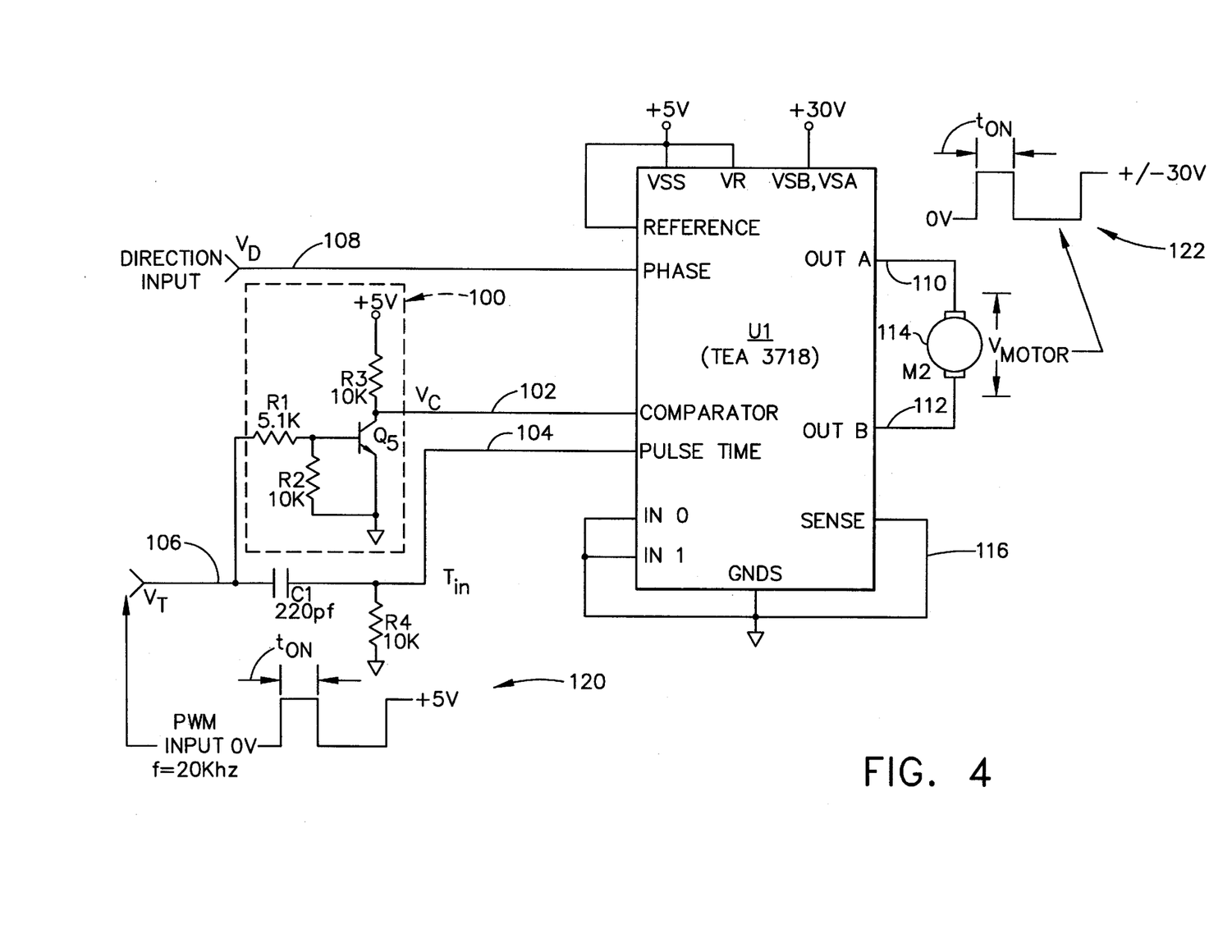
FIG. 4 is a simplified schematic diagram of the electrical interface circuit used in creating the DC servo motor driver circuit of the present invention, which includes an integrated circuit designed to drive a stepper motor.

The interface circuitry of the present invention is illustrated in FIG. 4 as that interface circuitry is connected to an integrated circuit U1. U1 preferably is a part number TEA3718, manufactured by SGS-Thomson Microelectronics. This device is typically used as a stepper motor driver, however, in the present invention it is configured with appropriate interface circuitry for use in driving a DC servo motor "M2," designated by the reference numeral 114 on FIG. 4.

On FIG. 4, the block diagram for U1 shows the pin-outs and their designations, as according to the SGS-Thomson handbook. The logic level voltage for U1 is set at +5 volts DC, and this preferably is a regulated voltage. The motor drive voltage for U1 is preferably at +30 volts DC, which may not be very well regulated. The output pins on U1 are designated as "Out A" and "Out B", which also are the connections to the motor 114 via the electrical lines 110 and 112 on FIG. 4. Some of the other lines are attached either to +5 volts DC, or to DC common or ground. In particular, the "Sense" input at 116 is connected to DC common. If this integrated circuit were to be used with a stepper motor, the Sense line 116 would be connected to a low value resistor through which the motor current would flow, and the voltage across this resistor would be a direct indication of the current flow through the motor winding. In the present invention, however, it is preferred to directly tie this Sense line to ground or DC common.

Figure 5:
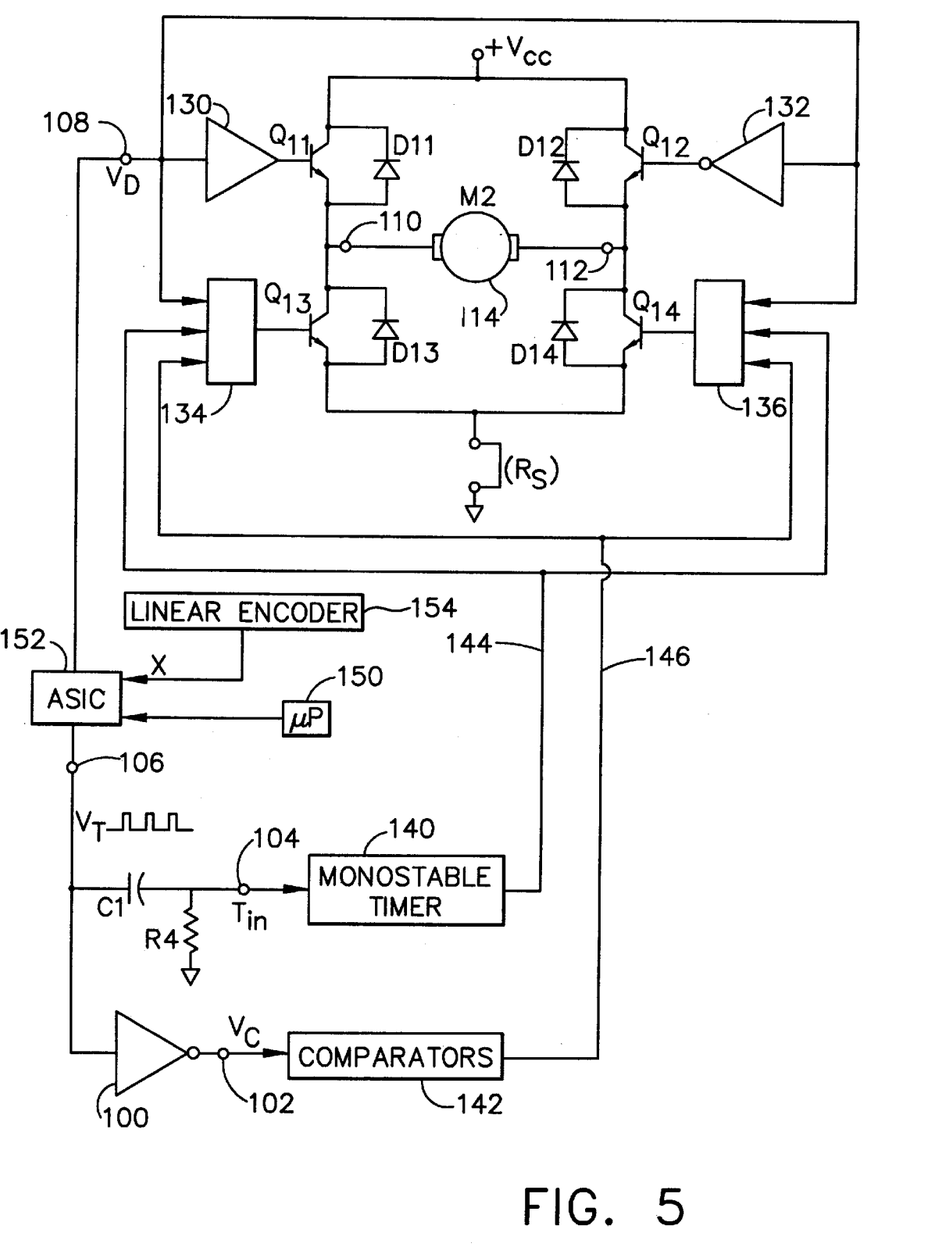
FIG. 5 is a block diagram in partial schematic of the DC servo motor driver of FIG. 4.

The "Phase" input at 108 is provided with a "direction" input voltage signal, designated as $V_D$, which is provided by an ASIC 152 (see FIG. 5). A pulse-width modulated signal $V_T$ is provided at 106 also from the same ASIC, and this signal is provided to an RC circuit (i.e., C1 and R4), and the resulting signal, designated as $T_{in}$, is connected to the "Pulse Time" input at 104.

The same signal $V_T$ at 106 is also provided to a transistor circuit 100 which acts as a voltage inverter. This transistor circuit comprises resistors R1, R2, and R3 and a bipolar transistor Q5. The output of this transistor circuit is designated as $V_C$, which is connected to the "Comparator" input at 102.

The pulse signal $V_T$ at 106 preferably is a pulse-width modulated signal running at 20 kHz, as indicated by the waveform graph 120. The output signal across the motor windings at 110 and 112 will also be a pulse-width modulated signal running at a higher voltage magnitude, as indicated by the waveform graph 122. While the input pulse voltage 120 runs at logic levels between zero volts and +5 volts DC, the output voltage across the motor 114 has a magnitude of either zero to +30 volts DC (in the forward direction) or zero to –30 volts DC (in the reverse direction).

FIG. 5 depicts a more complete circuit used in the present invention, which not only shows the ASIC and microprocessor, but also illustrates some of the internal components of U1. A microprocessor 150 is provided to control an ASIC 152, which in turn receives position information (as a signal "X") from a linear encoder 154. ASIC 152 also provides certain signals to U1 and to the interface circuitry. A signal $V_D$ is provided at 108 as a direction input signal, also referred to as the "Phase" in terminology used with the SGS-Thomson TEA3718 chip. A signal $V_T$ is provided at 106 to the RC network C1 and R4, and also as provided to the inverter circuit 100.

The signal $V_T$ is a pulse-width modulated signal, as indicated by the waveform pulses on FIG. 5. After this pulsed signal passes through the RC network, its waveform changes and is applied at 104 as a signal $T_{in}$ to a monostable timer 140, which is part of U1. The waveform of $T_{in}$ is depicted in greater detail on FIG. 7 at a graph 280. The pulsed signal $V_T$, after inversion, is supplied as a signal $V_C$ at 102 to the voltage comparators 142, which are part of U1.

The other ASIC output signal is $V_D$ which is applied at 108 to U1. This signal is input to a non-inverting driver 130, which in turn supplies the signal to a bipolar transistor Q11. The same signal $V_D$ is applied to an inverting driver 132, which in turn provides a signal to another bipolar transistor Q12. Signal $V_D$ is also applied to a pair of logic circuits that also act as driver circuits, designated by the reference numerals 134 and 136. These two logic/drivers provide signals to control two more bipolar transistors Q13 and Q14. It will be understood that any type of solid-state switching device could be used in lieu of physical transistors without departing from the principles of the present invention, so long as the other type of switching device provided a sufficient current rating and could withstand the necessary voltage levels involved (e.g., +30 VDC).

The output of monostable timer 140 is also applied at 144 to both of the logic/driver circuits 134 and 136. In a similar manner, the output of the comparators 142 is also applied at 146 to the same two drivers 134 and 136.

It can be seen on FIG. 5 that, internal to U1, there is another H-bridge output drive circuit, which generally comprises the four transistors Q11–Q14, as well as the motor winding of motor 114, which is connected at the outputs 110 and 112. Whereas U1, as a chip type, typically drives one of the two motor coils of a stepper motor, in the present invention of FIG. 5, the motor 114 is a DC servo motor. To accomplish this feat, the H-bridge transistors Q11–Q14 must be able to provide the same type of signals as provided by the conventional H-bridge transistors Q1–Q4 depicted in the prior art circuit of FIG. 1. This is accomplished by the interface circuitry depicted on FIGS. 4 and 5.

When it is desired to drive the DC servo motor 114 in the forward direction, ASIC 152 will cause its output signal $V_D$ to change logic states to a Logic 1, which will turn on transistor Q11, and will turn off transistor Q12, by way of their respective logic circuits 130 and 132. For current to flow through the winding of motor 114, not only must Q11 be turned on, but also Q14 must be turned on. This is accomplished by driving the comparators with a signal $V_C$ at a Logic 0, which will fool the comparators into thinking that the "Sense" voltage has fallen below the desired level, which means that the motor requires more current. Therefore, the comparators 142 will output a signal at 146 to drive the two logic/drivers 134 and 136 into their ON-state. Simultaneously, the signal $T_{in}$ provides a +5 volt spike to the monostable timer 140, which then causes its "one-shot" circuit to output a pulse at 144, which then drives a signal to the two logic/driver circuits 134 and 136. The detail of the waveform at $T_{in}$ are provided on FIG. 7 at the graph 280.

Since $V_D$ is at Logic 1, the logic/driver 136 will turn its output on, whereas the logic/driver 134 does not turn its output on. Therefore, the output transistor Q14 is turned on, which allows current to flow in the forward direction through the motor 114. Transistor Q14 is held on for the entire duration of the ON-time of pulse signal $V_T$, in the preferred embodiment illustrated on FIG. 5.

To rotate motor 114 in its reverse direction, the voltage must be reversed across the windings at 110 and 112. This is accomplished by the direction signal $V_D$ being held to its Logic 0 state, while at the same time causing the pulse-width modulated signal $V_T$ to be output to the monostable timer 140 and the comparator 142. With $V_D$ held at Logic 0, the transistors Q11 and Q14 will be held in their OFF states. Simultaneously, the opposite transistors Q12 and Q13 will be turned on at the appropriate times, since the direction signal is inverted by the logic gate 132 which drives transistor Q12, and the logic inside the logic/driver circuit 134 is opposite that of the logic/driver 136.

When the pulse-width modulated signal $V_T$ is now applied to the RC circuit and to the inverter 100, the comparators 142 will again be fooled into thinking that the "Sense" signal is calling for more current to flow through the motor winding. At the same time, the monostable timer 140 is caused to trigger a signal through its output at 144. When all of this occurs, the logic/driver circuit 134 turns on Q13. By this method, transistor Q 13 is turned on and off at the same duty cycle as the pulse signal $V_T$.

Figure 6:
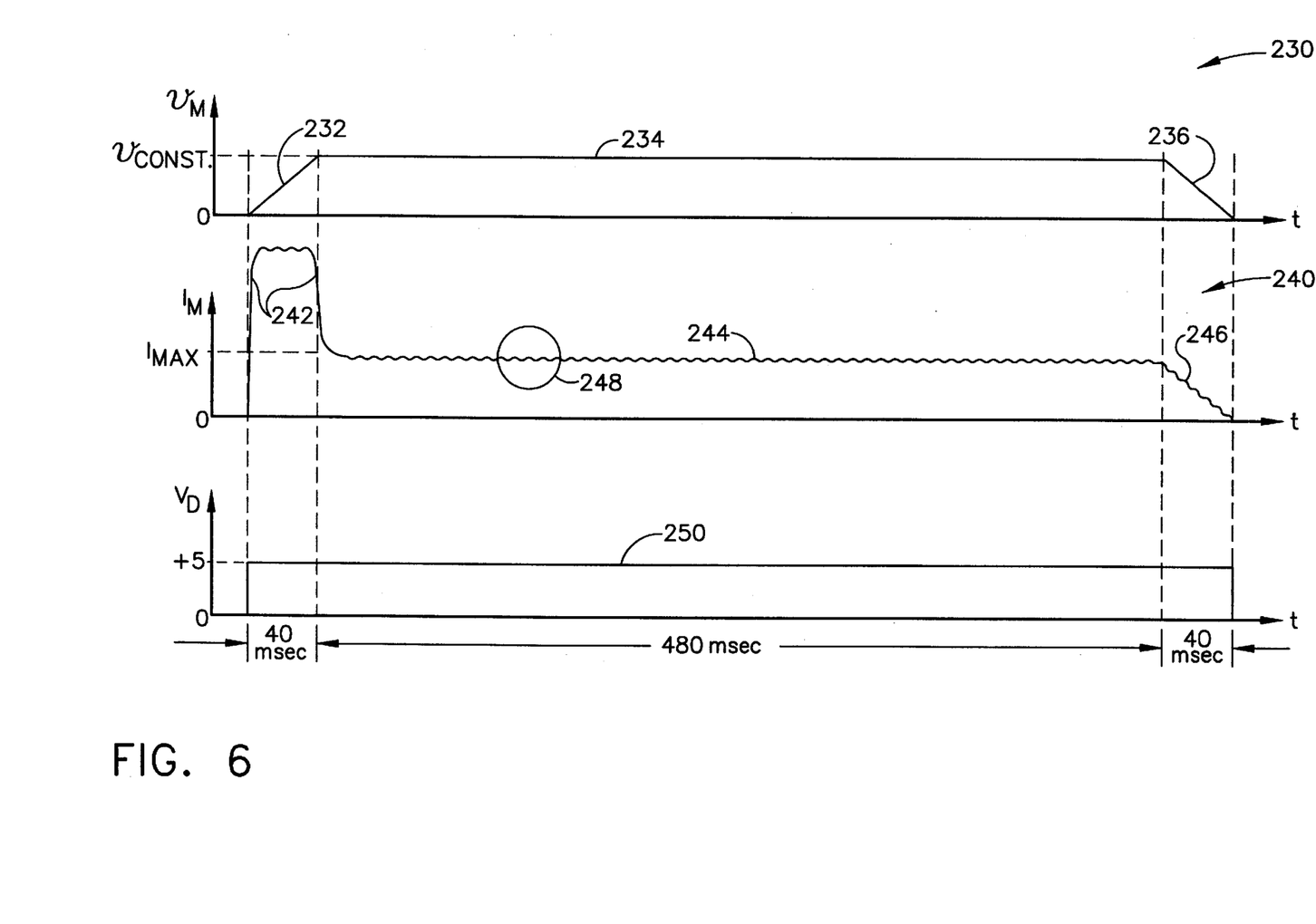
FIG. 6 is a diagram of some of the physical parameters versus time for the DC servo motor driver of FIG. 4.
Figure 7:
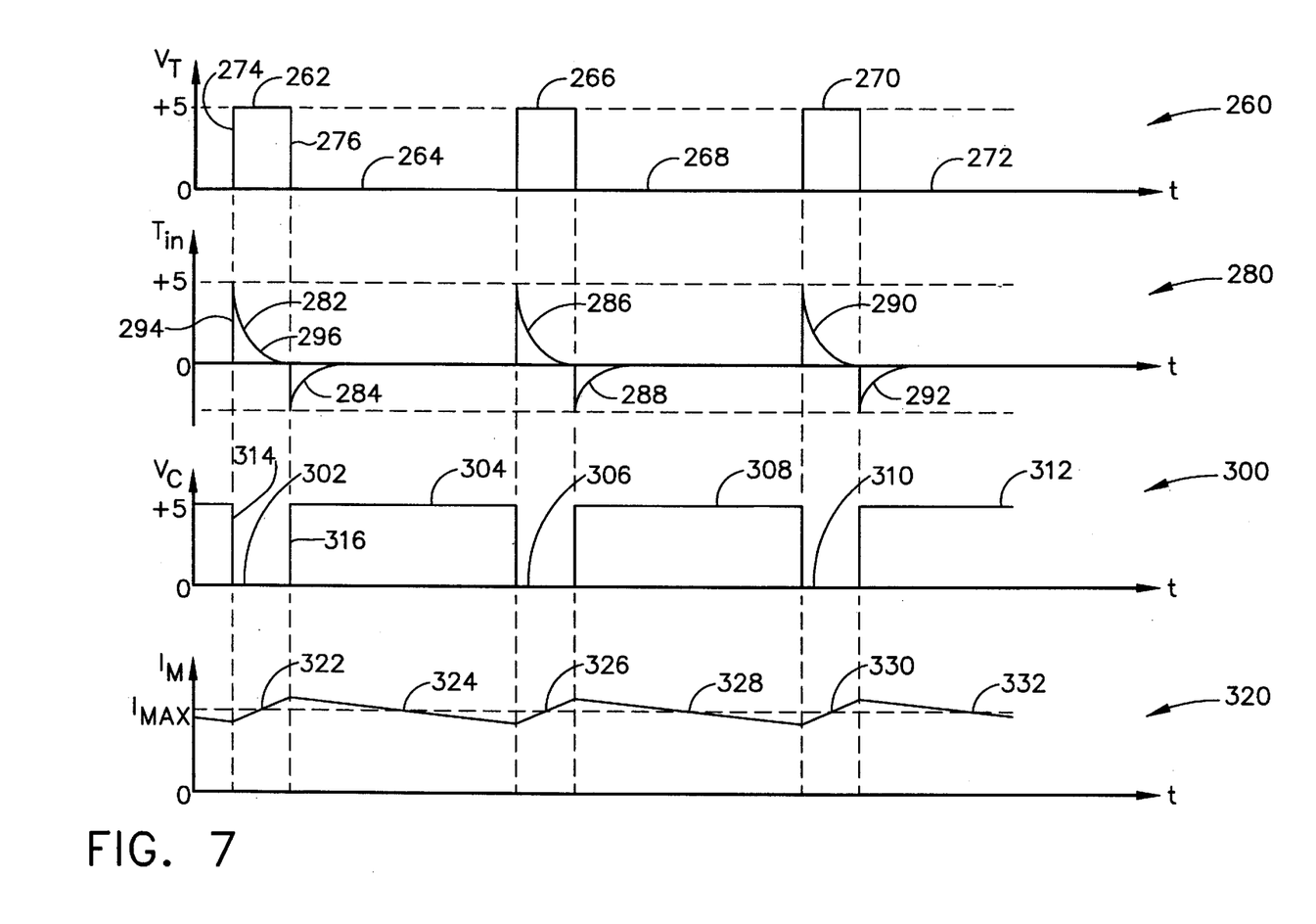
FIG. 7 is another set of diagrams for other physical parameters versus time for the servo motor driver of FIG. 4.

FIGS. 6 and 7 show some details of the waveforms of certain signals that are generated by the preferred embodiment of the present invention illustrated on FIGS. 4 and 5. On FIG. 6, the motor velocity, motor current, and direction voltage are illustrated along a relatively long time base, which shows one entire carriage travel of the ink jet cartridge carriage. As seen along the bottom edge of FIG. 6, the ramp up time is approximately 40 milliseconds (msec), the constant velocity portion of the sweep is about 480 msec in duration, and the ramp down time is another 40 msec. The direction signal $V_D$ rises from zero volts to +5 volts DC during the entire forward movement of the carriage, as depicted by a curve 250. During this forward sweep, the motor velocity ramps up at 232, maintains a relatively constant velocity at the line 234, and ramps down at 236, on a graph 230. On a graph 240, the motor current is seen to rise to an inertial load peak at a curve 242, then remains at a relatively constant "maximum" constant speed current value that exhibits some ripple at 244, and then ramps down at 246 along a somewhat jagged line. Details of this rippled constant current are depicted on FIG. 7, which is a magnification of a portion of the line 244, as depicted by the circle 248.

On FIG. 7, the time scale has been greatly expanded so as to show some details of the pulses that operate at a much higher frequency of approximately 20 kHz. A graph 260 shows the pulse-width modulated output voltage $V_T$ from ASIC 152. As can be seen in this graph, the pulses are ON at a +5 volt DC level at the intervals 262, 266, and 270. The signal then shows OFF-times at the portions of the waveform at 264, 268, and 272. Each of the pulses on graph 260 exhibits a leading edge 274 and a trailing edge 276, and in the case of the voltage $V_T$, the leading edge 274 is a rising edge and the trailing edge 276 is a falling edge, since the pulses being described at 262, 266, and 270 are positive-going pulses.

The comparator signal $V_C$ shows exactly the opposite logic on a graph 300. On this curve, during the ON-times for the transistors Q11–Q14, the voltage of $V_C$ is at Logic 0 during the time periods at 302, 306, and 310. During the OFF-times, the $V_C$ signal is at Logic 1 at 304, 308, and 312. Each of the pulses on graph 300 exhibits a leading edge 314 and a trailing edge 316, and in the case of the voltage $V_C$, the leading edge 314 is a falling edge and the trailing edge 316 is a rising edge, since the pulses being described at 302, 306, and 310 are negative-going pulses.

It will be understood that, in the illustrated embodiment of FIGS. 4–7, the leading edge 274 of $V_T$ occurs in time substantially simultaneously with the leading edge 314 of $V_C$, and therefore, is substantially synchronized with the comparator signal $V_C$. Moreover, it will also be understood that, in the illustrated embodiment of FIGS. 4–7, the trailing edge 276 of $V_T$ occurs in time substantially simultaneously with the trailing edge 316 of $V_C$. Of course, the initiating or driving signal in this circuit is the voltage signal $V_T$.

A graph 280 on FIG. 7 depicts the waveform of the voltage signal $T_{in}$. This is the signal that is shaped by the RC circuit which comprises C1 and R4, and which signal is used to trigger the monostable timer 140. It is preferred that this type of waveform signal be used to drive into the monostable timer input of the U1 integrated circuit, because without such a waveform, the triggering of the monostable timer could likely become unreliable. For example, if the "Pulse Time" input at 104 is held to ground, or is set to a +5 logic state continuously, then the monostable timer will not always successfully trigger every time the comparators receive a new pulse signal. Therefore, the RC circuit is used to provide a positive voltage spike at the beginning of the ON-times for each period of the duty cycle of the pulse-width modulated signal $V_T$.

It additionally is preferable that the time constant of this RC network is very short, so that the voltage level exponentially decays to zero (or near-zero) well in advance of the falling edge of the signal $V_T$. This can be easily seen on the graphs 260 and 280, such that the trailing edge 296 of the waveform of the voltage signal 282 falls to zero well in advance of the falling edge of the pulse signal 262. This type of waveform will occur for each of the periods of the pulse-width modulated signal, as illustrated at 286 and 290. Each of the above-described pulses on graph 280 exhibits a leading edge 294 and a trailing edge 296, and in the case of the voltage $T_{in}$, the leading edge 294 is a rising edge and the trailing edge 296 is a falling edge, since the pulses being described at 282, 286, and 290 are positive-going pulses.

It will be understood that, in the illustrated embodiment of FIGS. 4–7, the leading edge 274 of $V_T$ occurs in time substantially simultaneously with the leading edge 294 of $T_{in}$. Moreover, it will also be understood that, in the illustrated embodiment of FIGS. 4–7, the trailing edge 276 of $V_T$ preferably occurs in time well after (within the respective time frame of the graphs of FIG. 7) the trailing edge 296 of $T_{in}$ falls below a Logic 0 level for whatever type of logic gates are used at the Pulse Time input signal 104 of U1. If the frequency of $T_{in}$ is 20 kHz, and if the illustrated duty cycle on FIG. 7 is approximately 20%, the ON-time pulses (e.g., pulses 262 and 302) will have a duration of approximately 10 μsec, and the OFF-time duration (e.g., at 264 and 304) will be approximately 40 μsec, leading to a total duty cycle period of 50 μsec.

With the circuitry depicted on FIGS. 4 and 5, the signal $T_{in}$ will also exhibit a small negative-going spike at the end of the ON time for each pulse. This is depicted at the negative spikes and exponential decays at 284, 288, and 292.

The resultant motor current is depicted on a graph 320. Since this graph is taken from the circle 248 which occurs during the constant velocity travel of the carriage, the motor current has already reached its preferred value to maintain this motor speed. This current is designated as "$I_{MAX}$," which is not truly the maximum current that can be supplied through this driver circuit, but is merely being designated as such to illustrate this being the normal maximum current during the constant velocity phase of the movement of the carriage. On graph 320, the instantaneous current increases linearly during each ON-pulse of the signal $V_T$, which is illustrated at the lines 322, 326, and 330. During the corresponding OFF-times of $V_T$, the current will exponentially decay, as illustrated at 324, 328, and 332. It should be noted, however, that the exponential decay cannot be readily discerned at this high frequency because of the relatively long time constant involved with the motor inductance.

By use of the interface circuitry depicted on FIGS. 4 and 5, an integrated circuit normally used to drive a stepper motor can be "fooled" into driving a DC servo motor with complete satisfaction. The comparator signal $V_C$ at 102 is actually the signal that causes the output drive transistors to appropriately turn on and off. Since the output of the comparators 142 depends upon whether nor not the comparators believe that a sufficient amount of current is being supplied to the motor, then causing the output of the comparators to be clamped to a Logic 0 will cause the output transistors to turn on, by causing the comparators to believe that more current is needed for the motor 114. Alternatively, causing the comparators output at 146 to jump to a Logic 1 state will turn off the output transistors, because the comparators now believe that a sufficient amount of current has been supplied to the motor 114.

For an exemplary ink jet printer manufactured by Lexmark International, Inc., a 10% duty cycle or less is all that is required during the constant velocity phase of the carriage movement, given that the drive voltage is at +30 volts DC. In such an exemplary printer, the wattage consumed by the motor during the constant velocity phase is in the range of three (3) to five (5) Watts. During the acceleration phase of the carriage, the power consumed by the motor is in the range of twelve (12) to twenty (20) Watts. The duty cycle during this acceleration phase typically is a maximum of about 67%.

It will be understood that various minor changes to the interface circuitry could be made without departing from the principles of the present invention. Furthermore, other types of motor driver circuitry could be used to drive a DC servo motor which also may require a similar interface circuit for proper operation with a DC servo motor, without departing from the principles of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method for controlling a servo motor, said method comprising:

(a) providing (i) a stepper motor controller integrated circuit, (ii) a DC servo motor that rotates in two directions, (iii) a pulse-width modulated speed control signal, (iv) a direction control signal, and (v) an interface circuit;

(b) applying said direction control signal to a Phase control input of said stepper motor controller integrated circuit such that: a first logic state of said direction control signal tends to cause said DC servo motor to rotate in a forward direction, and a second logic state of said direction control signal tends to cause said DC servo motor to rotate in a reverse direction;

(c) applying said speed control signal to said interface circuit which generates (i) a comparator signal that is provided to a Comparator input of said stepper motor controller integrated circuit, and (ii) a trigger signal that is provided to a Pulse Time input of said stepper motor controller integrated circuit, said speed control signal generating pulses at times that said DC servo motor is to rotate in either direction; and (d) applying an output signal that is generated by said stepper motor controller integrated circuit to said DC servo motor at times that said DC servo motor is to rotate in either direction, said output signal having a duty cycle of pulses related to a duty cycle of said speed control signal.

2. The method as recited in claim 1, wherein said comparator signal is logically inverted from said speed control signal.

3. The method as recited in claim 1, wherein said trigger signal exhibits a waveform that rises quickly upon the rising edge of each pulse of said speed control signal, and falls exponentially due to a time constant of said interface circuit that allows said trigger signal to approach a logic zero before the falling edge of each pulse of said speed control signal.

4. The method as recited in claim 1, wherein said speed control signal's duty cycle is varied so as to control the average amount of current over time that is provided to said DC servo motor to meet the speed requirements over time for a member driven by said DC servo motor.

5. A method for controlling a servo motor, said method comprising:

(a) providing (i) a stepper motor controller integrated circuit, (ii) a DC servo motor that rotates in two directions, (iii) a direction control signal, (iv) a comparator signal, and (v) a trigger signal;

(b) rotating said DC servo motor in a forward direction by applying said direction control signal at a first logic state to a Phase control input of said stepper motor controller integrated circuit, applying said trigger signal as a series of pulses to a Pulse Time input of said stepper motor controller integrated circuit, and applying said comparator signal as a series of pulses to a Comparator input of said stepper motor controller integrated circuit, wherein (i) a leading pulse edge of said comparator signal is substantially synchronized with a leading pulse edge of said trigger signal, (ii) a trailing pulse edge of said comparator signal occurs after a trailing edge of said trigger signal, and (iii) during the time between its leading and trailing edges, said comparator signal exhibits a voltage level so as to call for more current to be output from said stepper motor controller integrated circuit to said DC servo motor; and (c) rotating said DC servo motor in a reverse direction by applying said direction control signal at a second logic state to a Phase control input of said stepper motor controller integrated circuit, applying said trigger signal as a series of pulses to a Pulse Time input of said stepper motor controller integrated circuit, and applying said comparator signal as a series of pulses to a Comparator input of said stepper motor controller integrated circuit, wherein (i) a leading pulse edge of said comparator signal is substantially synchronized with a leading pulse edge of said trigger signal, (ii) a trailing pulse edge of said comparator signal occurs after a trailing edge of said trigger signal, and (iii) during the time between its leading and trailing edges, said comparator signal exhibits a voltage level so as to call for more current to be output from said stepper motor controller integrated circuit to said DC servo motor.

6. The method as recited in claim 5, wherein said comparator signal is logically inverted from said trigger signal.

7. The method as recited in claim 5, wherein said trigger signal exhibits a waveform that rises quickly upon the rising edge of each pulse of a speed control signal, and falls exponentially while exhibiting a time constant that allows its falling voltage to approach a logic zero before the falling edge of each pulse of said speed control signal.

8. The method as recited in claim 7, wherein said speed control signal's duty cycle is varied so as to control the average amount of current over time that is provided to said DC servo motor to meet the speed requirements over time for a member driven by said DC servo motor.

9. A servo motor control circuit, comprising:

(a) a logic circuit that generates: (i) a pulse-width modulated speed control signal and (ii) a direction control signal;

(b) an interface circuit that receives said speed control signal and generates: (i) a comparator signal, and (ii) a trigger signal;

(c) a stepper motor controller integrated circuit, having: (i) a Phase input that receives said direction control signal, (ii) a Comparator input that receives said comparator signal, (iii) a Pulse Time input that receives said trigger signal, (iv) a motor drive output signal, and (v) a timer circuit;

(d) said logic circuit being configured: (i) to generate electrical pulses on said speed control signal at times when said motor drive output signal is to output current, a duty cycle of said speed control signal being related to the average amount of current that is to be output over time, and (ii) to place said direction control signal into a first logic state or a second logic state, relating to the direction of current flow that is to be output at said motor drive output signal; and (e) said interface circuit being configured: (i) to generate said comparator signal having a value that causes said stepper motor controller integrated circuit to generate current at said motor drive output signal at times when said logic circuit generates electrical pulses on said speed control signal, and (ii) to generate a trigger signal having a value that causes said stepper motor controller integrated circuit to enable its timer circuit and thereby allow output current to flow at said motor drive output signal;

said motor drive output signal having a duty cycle of pulses related to said duty cycle of said speed control signal.

10. The servo motor control circuit as recited in claim 9, further comprising a DC servo motor electrically connected to said motor drive output signal, said DC servo motor rotating in a forward direction when current is output from said motor drive output signal in a first direction, and said DC servo motor rotating in a reverse direction when current is output from said motor drive output signal in a second, opposite direction.

11. The servo motor control circuit as recited in claim 10, wherein said DC servo motor rotates in said forward direction at times when said direction control signal is in its first logic state, and wherein said DC servo motor rotates in said reverse direction at times when said direction control signal is in its second logic state.

12. The servo motor control circuit as recited in claim 9, wherein said logic circuit comprises a processing circuit and an Application Specific Integrated Circuit, and said interface circuit comprises a logic inverter circuit and an RC time constant circuit.

13. The servo motor control circuit as recited in claim 12, wherein said logic inverter circuit of said interface circuit receives said speed control signal and outputs said comparator signal such that, when said speed control signal exhibits a positive-going pulse, said comparator signal substantially simultaneously exhibits a negative-going pulse, and vice-versa.

14. The servo motor control circuit as recited in claim 13, wherein said comparator signal is a pulse-width modulated signal and: (i) exhibits a Logic 0 state at times when it is desired to generate current at said motor drive output signal, and (ii) exhibits a Logic 1 state at times when it is desired to not generate current at said motor drive output signal.

15. The servo motor control circuit as recited in claim 13, wherein said comparator signal is a pulse-width modulated signal that exhibits substantially the same duty cycle as said speed control signal, but in the opposite logic sense.

16. The servo motor control circuit as recited in claim 12, wherein said RC time constant circuit of said interface circuit receives said speed control signal and outputs said trigger signal such that, when said speed control signal exhibits a positive-going pulse, said trigger signal substantially simultaneously exhibits a positive-going pulse, and thereafter said trigger signal exhibits an exponential time constant decay waveform that approaches zero volts before the falling edge of each pulse of said speed control signal.

17. A servo motor control circuit, comprising:

(a) a logic circuit that generates: (i) a pulse-width modulated speed control signal that provides pulses at times when it is desired to generate an output current of a motor drive output signal, and (ii) a direction control signal that is placed into one of a first logic state and a second logic state, relating to the direction of current flow of said motor drive output signal;

(b) an interface circuit that receives said speed control signal and generates: (i) a comparator signal, and (ii) a trigger signal;

(c) a motor controller circuit comprising: (i) a comparator, (ii) a timer circuit, (iii) a direction logic circuit, (iv) a forward direction driver, (v) a reverse direction driver, (vi) a plurality of output switching devices that generate said motor drive output signal, (vii) a Phase input that communicates said direction control signal to said direction logic circuit, (viii) a Comparator input that communicates said comparator signal to said comparator, and (ix) a Pulse Time input that communicates said trigger signal to said timer circuit; said comparator outputting a signal to one of said forward direction driver and said reverse direction driver; and said timer circuit outputting a signal to one of said forward direction driver and said reverse direction driver;

(d) said motor controller circuit and said interface circuit being configured to:

(i) generate a pulse output at said motor drive output signal in a forward direction when: (A) said direction logic circuit receives said direction control signal at said Phase input having a first logic state, (B) said Comparator input receives said comparator signal having a first logic state that causes said comparator to output a signal to said forward direction driver, (C) said Pulse Time input receives said trigger signal as a pulse that causes said timer circuit to output a signal to said forward direction driver, (D) said direction logic circuit outputs a signal that allows current to flow through at least one of said plurality of output switching devices, (E) said forward direction driver outputs a signal that allows current to flow through at least one other of said plurality of output switching devices, thereby allowing current of said motor driver output signal to flow in a forward direction; and (ii) generate a pulse output at said motor drive output signal in a reverse direction when: (A) said direction logic circuit receives said direction control signal at said Phase input having a second logic state, (B) said Comparator input receives said comparator signal having a first logic state that causes said comparator to output a signal to said reverse direction driver, (C) said Pulse Time input receives said trigger signal as a pulse that causes said timer circuit to output a signal to said reverse direction driver, (D) said direction logic circuit outputs a signal that allows current to flow through at least one of said plurality of output switching devices, (E) said reverse direction driver outputs a signal that allows current to flow through at least one other of said plurality of output switching devices, thereby allowing of at said motor driver output signal to flow in a reverse direction;

and wherein said motor drive output signal exhibits a duty cycle of pulses related to a duty cycle of said speed control signal.

18. The servo motor control circuit as recited in claim 17, wherein said plurality of output switching devices comprises four transistors connected in an H-bridge output driver circuit configuration.

19. The servo motor control circuit as recited in claim 17, further comprising a DC servo motor electrically connected to said motor drive output signal, said DC servo motor rotating in a forward direction when current of said motor drive output signal is in a first direction, and said DC servo motor rotating in a reverse direction when current of said motor drive output signal is in a second, opposite direction.

20. The servo motor control circuit as recited in claim 19, wherein said DC servo motor rotates in said forward direction at times when said direction control signal is in its first logic state, and wherein said DC servo motor rotates in said reverse direction at times when said direction control signal is in its second logic state.

21. The servo motor control circuit as recited in claim 17, wherein said logic circuit comprises a processing circuit and an Application Specific Integrated Circuit, and said interface circuit comprises a logic inverter circuit and an RC time constant circuit.

22. The servo motor control circuit as recited in claim 21, wherein said logic inverter circuit of said interface circuit receives said speed control signal and outputs said comparator signal such that, when said speed control signal exhibits a positive-going pulse, said comparator signal substantially simultaneously exhibits a negative-going pulse, and vice-versa.

23. The servo motor control circuit as recited in claim 22, wherein said comparator signal is a pulse-width modulated signal and: (i) exhibits a Logic 0 state at times when it is desired to generate current at said motor drive output signal, and (ii) exhibits a Logic 1 state at times when it is desired to not generate current at said motor drive output signal.

24. The servo motor control circuit as recited in claim 22, wherein said comparator signal is a pulse-width modulated signal that exhibits substantially the same duty cycle as said speed control signal, but in the opposite logic sense.

25. The servo motor control circuit as recited in claim 21, wherein said RC time constant circuit of said interface circuit receives said speed control signal and outputs said trigger signal such that, when said speed control signal exhibits a positive-going pulse, said trigger signal substantially simultaneously exhibits a positive-going pulse, and thereafter said trigger signal exhibits an exponential time constant decay waveform that approaches zero volts before the falling edge of each pulse of said speed control signal.

* * * * *